Patented Feb. 18, 1947

2,416,179

UNITED STATES PATENT OFFICE

2,416,179

METHOD OF FLUIDIZING SLAG

Frank R. Kemmer, Louisville, Ky., assignor to Reynolds Metals Company, a corporation of Delaware No Drawing. Application December 16, 1944, Serial No. 568,564

6 Claims. (Cl. 75—53)

This invention relates to conditioning silicate metallurgical slags containing oxides of lime and iron and particularly to the method of fluidizing such slags by chemical reaction with aluminum dross.

Aluminum dross as separated after the melting, stirring and fluxing of aluminum or its alloys, contains metallic aluminum and such compounds as aluminum oxide, nitride and carbide.

Since the method is particularly useful in the open hearth steel process, the invention will be illustrated by detailed description in connection with this process.

In the manufacture of steel by the basic open hearth process, the charge in the open hearth furnace consists principally of the iron to be converted to steel, limestone or other source of calcium oxide, iron oxide, and silica. The iron which is to be converted to steel is frequently in the form of cold pig iron, steel scrap, molten pig iron or a mixture of such sources of iron. The slag forming materials of the charge will be mostly on top of the charge, although much of the limestone, iron oxide, and silica may be at the bottom until the iron is melted. The charge is heated by overhead flame and finished in a manner that is well understood.

In this open hearth steel production operation, fluorspar is commonly added to assist in fluxing the slag material.

Even with the use of fluorspar, however, there remain a number of disadvantages. The fluorspar, particularly when added in conjunction with iron oxide, causes the charge at one stage to foam, with a large increase in the volume. This foaming decreases the rate of transfer of heat through the slag to the iron. At times the foaming causes the charge to overflow the wall banks at the doors of the furnace, so that the charge in part pours out upon the floor of the furnace room. Accretions build up on the floor of the furnace that decrease the capacity and interfere with uniformity of quality of the steel produced. Also the rate of fluxing of the slag with the fluorspar is not as rapid as desired. In the early stages of silica formation, resulting from the oxidation of silicon in the metal bath, there is a great preponderance of lime with respect to silica. There is formed with the lime or on the surface of the lime particles, therefore, a silicate compound in which the molecular proportion of lime to silica may be in excess of two to one, and even as high as about four to one. These compounds have a very high melting point but their eventual dissolution is necessary.

Numerous attempts have been made to avoid the objections to the use of fluorspar by the use of other materials. Thus, the following materials among others have been tried as substitutes for fluorspar: Bauxite, ilmenite, and sodium chloride. Bauxite worked too slowly. All the materials in fact failed to achieve such success as to make possible important replacement of the fluorspar.

The present invention provides a fluidizing agent that may be used in place of the fluorspar, with avoidance of the stated disadvantages in the use of the fluorspar.

Briefly stated, the invention comprises the method of conditioning silicate metallurgical slags containing oxides of calcium and iron by chemical reaction of such slags with aluminum dross.

In general, the method of operation and the equipment used is the same as in the conventional metallurgical processes in which such slags are produced. In the basic open hearth steel process, for instance, my invention involves the direct substitution of aluminum dross for the fluorspar in those cases in which fluorspar is normally used or the addition of the aluminum dross to the charge in those cases in which fluorspar is not conventionally employed.

The proportion of the aluminum dross to be added varies with the proportions of iron oxide, lime and other slag forming ingredients in the charge and also with the total weight of slag producing materials in the charge. In general the proportion of the aluminum dross used is that adequate to initiate reaction between the slag forming ingredients and cause the slag to be free flowing and smooth at furnace temperatures. Examples of suitable proportions of the aluminum dross that may be used are 1 to 3 pounds of actual aluminum present for each ton of iron in the charge.

As the dross, there may be used any one of the different types of dross that are made in commercial melting, stirring or fluxing of aluminum or its alloys and removal of the molten material from the furnace or crucible. Thus, there may be used the primary dross which floats on the surface of molten aluminum. Also there may be used the dross residue which remains after separating, from the primary dross, as much of the metallic aluminum as is economically feasible by such processing as crushing, milling, and screening.

Dross separated commercially contains considerable metallic aluminum. The dross used by me must contain at least 10% by weight of metallic aluminum. Drosses of lower percentage than this in metal content have been found by me to be unsatisfactory in slag fluidizing. For best results the aluminum metal content should be 30 to 80%. Drosses that give particularly satisfactory results contain 50 to 80% of metallic aluminum and before compounding have been predominantly in the form of granules between 4 and 40 mesh in size.

The dross may be used in the form of units of substantial size, say in the form of large granules or pieces up to one-half inch or more in longest dimension. Also it may be briquetted with binder materials, sintered, or nodulated in any convenient manner, in order to decrease the dusting which accompanies the use of very finely divided aluminum dross. Unless dusting is to be tolerated, the aluminum dross should be substantially free from particles as fine as 80 mesh.

As an admixture to the dross, I have found desirable the waste product known as "red mud" which results from the processing of bauxite with sodium hydroxide to produce alumina by the Bayer process. This red mud consists mostly of oxides of aluminum, iron, and silicon, with smaller amounts of oxides of calcium, titanium, and sodium. The red mud may be mixed moist with the aluminum dross and the whole formed into briquettes or sintered into nodules for convenient handling, charging, and use without the formation of dust. When it is desired to increase the strength of the shaped masses before heating, there may be used organic binders as, for instance, tall oil, starch, rosin, or casein. These binders are ordinarily unnecessary and the expense for them is usually unjustified.

If it is desired to use the aluminum dross in finely milled condition, the powder may be moistened to decrease dusting.

In place of the red mud or along with it as an admixture to the aluminum dross, there may be used iron oxide. This may be in any usual form, as, for example, blast furnace flue dust, iron ore, or mill scale. Iron oxide so used reacts with the aluminum of the dross with intense heat evolution. Fluorspar also may be used in a certain proportion, although not necessary for good commercial operation.

In carrying out the slag conditioning operation, the aluminum dross in selected form or mixture is added in the same manner that fluorspar is ordinarily added to basic open hearth operations. An exception, however, lies in the fact that the aluminum dross may be and preferably is added early in the heat. Even when so added, it does not cause foaming and overflow of the charge onto the floor of the furnace room. The dross is preferably added immediately after removal of the initially separated ("run off") slag of low calcium but high silica content and before the lime boil. The batch is then heated through the lime boil, to generate carbon dioxide from the limestone, and through the working period, to oxidize impurities in the iron, those periods overlapping each other. Temperatures of heating are the conventional ones for open hearth steel practice, as is also the technique of final separation of the resulting slag and molten steel. The temperature used is above the oxidizing temperature of aluminum and melting point of the slag formed and below the temperature of quick destruction of the lining of the furnace, the conditions to which the slag is exposed in the open-hearth furnace being known to be oxidizing.

The use of the aluminum dross not only reduces the foaming but improves the rate and effectiveness of conditioning of the slag to the flowable mass desired. It cuts down the time for this conditioning at a given temperature to about 2 to 5 minutes as compared to 15 minutes with fluorspar, the actual time required with the aluminum dross decreasing with the proportion of aluminum in the dross up to about 80% content of metallic aluminum. Furthermore, the use of the dross cuts down the accretions which otherwise gradually build up in the bottom of the basic open hearth furnace; for this reason, the use of the aluminum dross avoids the gradual decrease of the capacity of the furnace due to the accretions and gives smoother, more uniform operations.

In melting out these previously built up accretions, the furnace is emptied and the dross applied over the top of the accretions which remain on the bottom of the hearth. Then the furnace with the accretions and applied dross is fired. Under the influence of the flame, the dross and the accretions react to give a fluid slag. This is withdrawn.

Once these surprising results have been observed various theories to account for them may be advanced. It is considered that an important part of the effect of the dross in fluidizing the slag is due to the development of intense heat by the oxidation of the aluminum metal at the particular place where very high temperature is most important in initiating melting together and causing reaction of the originally solid slag forming materials. The aluminum oxide formed at such high temperature and also that present in the dross as used react with the oxides and becomes a component of the slag.

Fluidizing the slag (i. e. making it more flowable) gives, over the surface of the charge in the furnace, a fluid slag which transmits properly the heat from the flame through the slag to the iron below. Furthermore, the quick fluidizing of the slag decreases radiation of heat to the furnace roof and side walls by large upstanding lumps of incandescent lime that otherwise are present for an objectionably long period. Also the fluidizing of the slag causes fluxing of the objectionable bottom accretions.

While the invention has been illustrated by the open hearth steel process, it is to be understood that other metallurgical slags may be fluidized in like manner. Thus the aluminum dross may be added to silicate slag forming materials containing oxides of iron and calcium that are present in the commonly used furnace processes for the smelting of lead and copper.

It will be understood also that it is intended to cover all changes and modifications of the example of the invention herein chosen for the purpose of illustration which do not constitute departures from the spirit and scope of the invention.

What I claim is:

1. The method of conditioning metallurgical slag which comprises adding aluminum dross containing at least 10% by weight of metallic aluminum to a basic open hearth steel charge including metallic iron, iron oxide, silica, and a source of calcium oxide and heating the resulting mixture to a furnace temperature above the melting point of the slag forming materials present and above the temperature of oxidation of the aluminum, this heating resulting in forming a slag and fluidizing the slag.

2. The method described in claim 1, the aluminum dross as added to the charge being in the form of units of substantial size including the dross and admixed iron oxide.

3. The method described in claim 1, the aluminum dross as added to the charge being in the form of units of substantial size including the dross, admixed iron oxide, and a binder.

4. The method described in claim 1, the aluminum dross being added to the charge after separation of the "run off" slag first formed in the open hearth steel furnace and before the lime boil.

5. The method described in claim 1, the aluminum dross as added to the charge being substantially free from particles finer than 80 mesh.

6. The method described in claim 1, including the admixture with the dross of red mud representing the sodium hydroxide insoluble residue from bauxite, briquetting the mixture of dross and red mud, and adding the resulting briquettes to the slag forming material.

FRANK R. KEMMER.

REFERENCES CITED

The following references are of record in the file of this patent:

UNITED STATES PATENTS

| Number | Name | Date |
| --- | --- | --- |
| 1,389,751 | Garr et al. | Sept. 6, 1921 |
| 1,949,529 | Browne | Mar. 6, 1934 |
| 1,658,879 | Browne | Feb. 14, 1928 |

OTHER REFERENCES

Open Hearth Proceedings, 1944, A. I. M. E., pages 221 to 223, inclusive.